(12) United States Patent
Mahani et al.

(10) Patent No.: US 11,645,019 B1
(45) Date of Patent: May 9, 2023

(54) DYNAMIC STANDARDIZED PRINTER PERFORMANCE MONITORING

(71) Applicants: Maryamossadat Nematollahi Mahani, Boulder, CO (US); Lisa Oakleaf, Boulder, CO (US); Vlad Alin Iordachescu, Mosnita veche (RO)

(72) Inventors: Maryamossadat Nematollahi Mahani, Boulder, CO (US); Lisa Oakleaf, Boulder, CO (US); Vlad Alin Iordachescu, Mosnita veche (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/591,760

(22) Filed: Feb. 3, 2022

(51) Int. Cl.
*G06F 3/12* (2006.01)

(52) U.S. Cl.
CPC .......... *G06F 3/1224* (2013.01); *G06F 3/1203* (2013.01); *G06F 3/1236* (2013.01); *G06F 3/1285* (2013.01)

(58) Field of Classification Search
CPC .... G06F 3/1224; G06F 3/1203; G06F 3/1236; G06F 3/1285
USPC ........................................................ 358/1.15
See application file for complete search history.

(56) References Cited

U.S. PATENT DOCUMENTS

| | | | | |
|---|---|---|---|---|
| 7,640,551 | B2* | 12/2009 | Obert ................. | G03G 15/5079 358/1.14 |
| 2007/0292145 | A1* | 12/2007 | Drose ................ | G03G 15/5079 399/9 |
| 2015/0293734 | A1* | 10/2015 | Shirai ................... | G06F 3/1234 358/1.15 |
| 2018/0176393 | A1 | 6/2018 | Celinder et al. | |
| 2018/0231967 | A1 | 8/2018 | Cohen et al. | |
| 2018/0285030 | A1* | 10/2018 | Yokoohji .............. | G06F 3/1256 |

FOREIGN PATENT DOCUMENTS

| | | |
|---|---|---|
| CN | 112148240 A | 12/2020 |
| CN | 112558890 A | 3/2021 |
| EP | 2393043 B1 | 4/2018 |

OTHER PUBLICATIONS (4B) PressReporter Demonstration Video; https://www.pressreporter.co.uk/pressreporter-demonstration-video; 2017-2020.

(Continued)

*Primary Examiner* — Allen H Nguyen
(74) *Attorney, Agent, or Firm* — Duft & Bornsen, PC (57) ABSTRACT

Systems and methods are provided for printer analytics. One embodiment includes a printer analytics server. The server includes a memory, an interface configured to collect performance data from a population of printers and a subject printer on an ongoing basis for storage in the memory, and a controller able to determine a production target for the subject printer relative to the population of printers based on the performance data. The production target dynamically varies over time as a function of the performance data of the population of printers. The controller is further able to generate reports indicating deviation of the subject printer from the production target, as the performance data for the subject printer and the population of printers changes over time, and to transmit the reports to a print server of a print shop that operates the subject printer.

20 Claims, 9 Drawing Sheets

(56) References Cited

OTHER PUBLICATIONS

30 Best Manufacturing KPIs and Metric Examples for 2021 Reporting; May 2, 2021; https://insightsoftware.com/blog/30-manufacturing-kpis-and-metric-examples.

PressReporter Demonstration Video; https://www.pressreporter.co.uk/pressreporter-demonstration-video; 2017-2020.

Real-time KPIs with ASM Performance Monitor; Jun. 26, 2019; https://www.asm-smt.com/en/news-center/press/real-time-kpis-with-the-asm-performance-monitor.

Your competitive insight. Performance Benchmarking; Heidelberg.

* cited by examiner

DYNAMIC STANDARDIZED PRINTER PERFORMANCE MONITORING

TECHNICAL FIELD

The following disclosure relates to the field of printing, and in particular, to monitoring printers.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

Because production printers are expensive pieces of machinery that form the heart of a print shop, any down time (e.g., due to inspection, maintenance, repair, etc.) at a production printer negatively impacts the overall productivity of the print shop. However, the real-world productivity and amount of expected down time varies between printers. Thus, it is not generally possible for a print shop operator to determine whether each printer is being operated in an optimally efficient manner at the print shop.

SUMMARY

Embodiments described herein provide for aggregate monitoring and reporting of printer productivity across multiple print shops, on a model-by-model or series-by-series basis. By identifying and reporting global metrics of performance for each type of printer, these embodiments enable operators to determine whether individual printers of each model or series are being operated in an efficient manner as compared to other printers of the same model in a real-world environment. Furthermore, this reporting may be performed continuously and in real-time, and may even be used to determine production targets for printers at a print shop.

One embodiment is a system that includes a printer analytics server. The server includes a memory, an interface configured to collect performance data from a population of printers and a subject printer on an ongoing basis for storage in the memory, and a controller able to determine a production target for the subject printer relative to the population of printers based on the performance data. The production target dynamically varies over time as a function of the performance data of the population of printers. The controller is further able to generate reports indicating deviation of the subject printer from the production target, as the performance data for the subject printer and the population of printers changes over time, and to transmit the reports to a print server of a print shop that operates the subject printer.

A further embodiment is a method that includes collecting performance data from a population of printers and a subject printer on an ongoing basis for storage in memory, and determining a production target for the subject printer relative to the population of printers based on the performance data. The production target dynamically varies over time as a function of the performance data of the population of printers. The method also includes generating reports indicating deviation of the subject printer from the production target, as the performance data for the subject printer and the population of printers changes over time, and transmitting the reports to a print server of a print shop that operates the subject printer.

A further embodiment is a non-transitory computer readable medium embodying programmed instructions which, when executed by a processor, are for a method. The method includes collecting performance data from a population of printers and a subject printer on an ongoing basis for storage in memory, and determining a production target for the subject printer relative to the population of printers based on the performance data. The production target dynamically varies over time as a function of the performance data of the population of printers. The method also includes generating reports indicating deviation of the subject printer from the production target, as the performance data for the subject printer and the population of printers changes over time, and transmitting the reports to a print server of a print shop that operates the subject printer.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
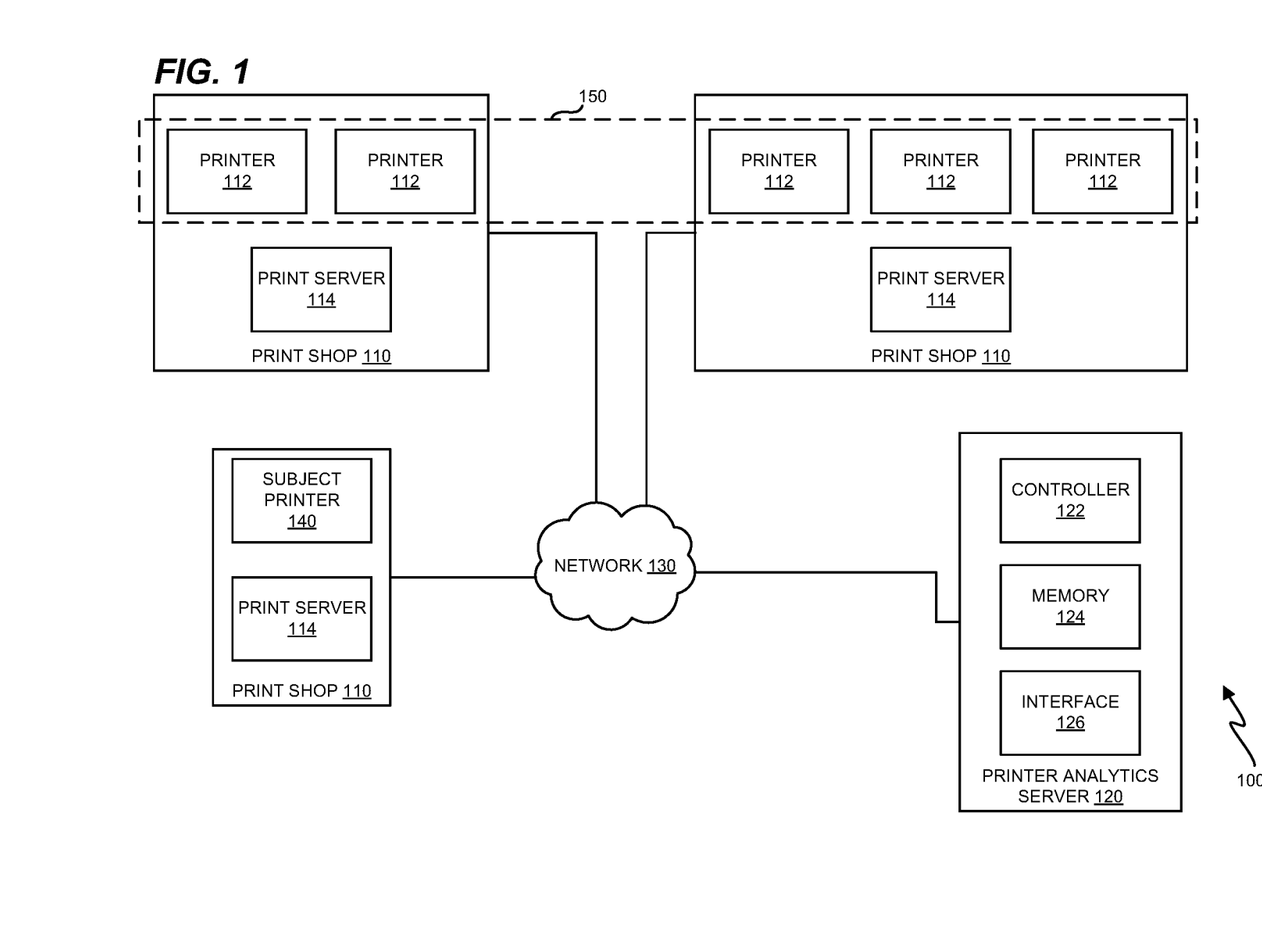
FIG. 1 is a block diagram of a printer monitoring environment in an illustrative embodiment.

FIG. 1 is a block diagram of a printer monitoring environment 100 in an illustrative embodiment. Printer monitoring environment 100 comprises any system, device, or component operable to actively track the production of one or more printers in one or more print shops. In this embodiment, printer monitoring environment 100 includes multiple print shops 110, which are monitored by a printer analytics server 120. Each print shop 110 includes a print server 114 and one or more printers 112. Print shops 110 need not all be operated by the same legal entity. In some embodiments, the print shops 110 are operated by different legal entities.

Printers 112 send performance data in real-time (e.g., page-by-page, once per minute, once per hour, once per day, etc.) to printer analytics server 120 via network 130. Network 130 may comprise the Internet or a private network. Interface 126, such as an ethernet or other network interface, receives the performance data. The performance data itself may be used by controller 122 to determine, in real-time, a number of pages or feet of print medium printed by each printer 112, or to determine other performance metrics. This information is then used to determine production targets for a subject printer 140. As used herein "subject printer" is a printer that is subject to tracking for deviation from production targets. Any number of printers, across any number of print shops, may be used as subject printers at once. Hence, there is no need for a single subject printer in any implementation discussed herein. Controller 122 stores the production targets in memory 124. Controller 122 may be implemented as custom circuitry, as a hardware processor executing programmed instructions, etc.

Controller 122 continuously monitors performance data for the population 150 in real-time, and updates production targets for the subject printer 140 in real-time, which ensures that the performance of the subject printer 140 is always being actively analyzed and compared to other printers.

The particular arrangement, number, and configuration of components described herein is illustrative and non-limiting. Illustrative details of the operation of printer monitoring environment will be discussed with regard to FIG. 1. Assume, for this embodiment, that printers 112 at one or more print shops 110 are actively printing print jobs in accordance with instructions from corresponding print shops 110, and are sending performance data to printer analytics server 120 for processing. In one embodiment, the performance data is sent directly to the printer analytics server 120, while in further embodiments, the performance data is sent to print server 114, which compiles and submits the performance data for analysis by the printer analytics server 120.

Figure 2:
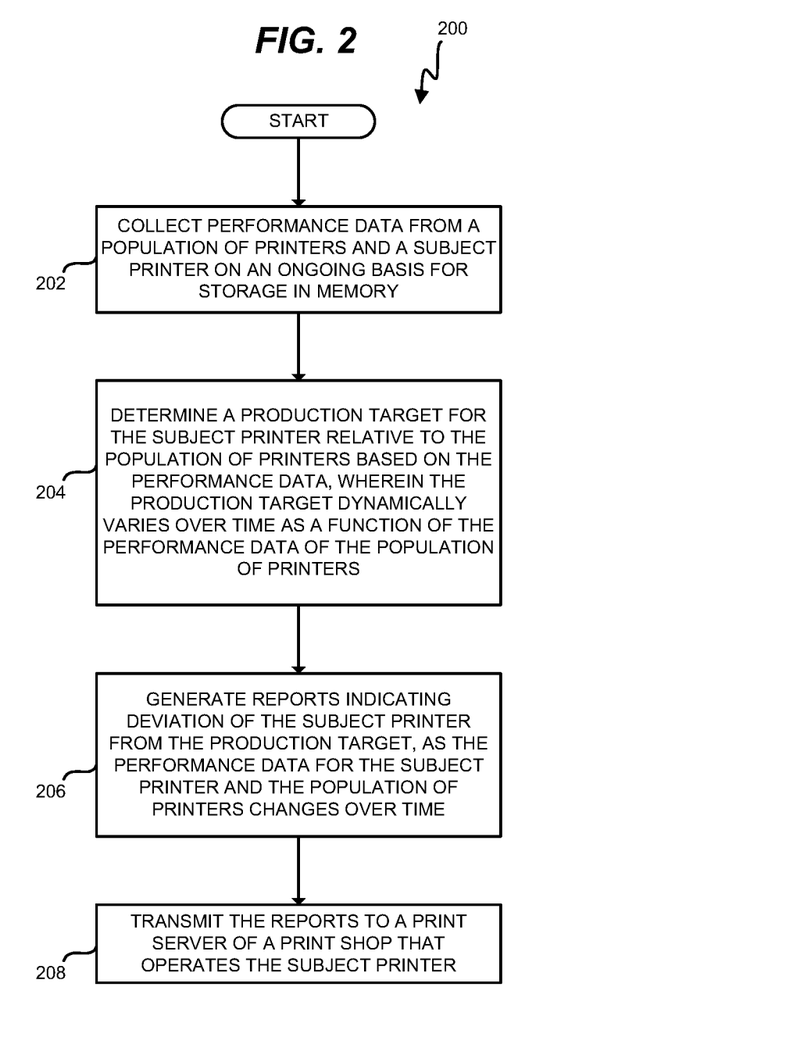
FIG. 2 is a flowchart illustrating a method for operating a printer monitoring environment in an illustrative embodiment.

FIG. 2 is a flowchart illustrating a method 200 for operating a printer monitoring environment 100 in an illustrative embodiment. The steps of method 200 are described with reference to printer analytics server 120 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, interface 126 collects performance data from a population 150 of printers 112 and a subject printer 140 on an ongoing basis for storage in memory 124. The population 150 may comprise all printers of the same model or series as the subject printer 140. Thus, in many embodiments, the subject printer 140 is itself a member of the population 150. In further embodiments, interface 126 collects performance data for many populations 150, each corresponding with a separate series or model of printer 112. This enables dynamic production targets to be generated and updated by controller 122 concurrently for many series or models of printer 112.

Performance data from the printers 112 may comprise Simple Networking Management Protocol (SMNP) messaging sent by the print engine at each printer 112 to a corresponding print server 114. In many embodiments, the messaging comprises raw data that is not human readable. This raw data is processed either by a print server 114 or the controller 122 of the printer analytics server 120 in order to determine the overall production of a printer 112 over a period of time, or over multiple print jobs. In an embodiment where a period of time is considered, the period of time may be a predefined period (e.g., a period between two defined times) or may be a rolling period of time (e.g., the previous hour, previous day, the previous month, etc.).

In one embodiment, controller 122 processes the raw data to determine a throughput (e.g., a number of pages or a number of linear feet printed by each printer 112 in the population 150 during a period of time). Production may also or alternatively be determined as a print speed, calculated based on throughput and up time for each printer 112 in the population 150 (e.g., throughput multiplied by a percentage of up time for each printer 112 during the period of time). Production may even be considered an amount of down time that a printer 112 experienced. In yet a further embodiment, controller 122 determines an adjusted throughput/production comprising a combination of such metrics. For example, controller 122 may determine adjusted throughput/production for a printer 112 as an amount of throughput, multiplied by a difference between up time and down time, and then divided by the amount of up time. Controller 122 may further scale or normalize an adjusted throughput/production according to a uniform scale, such that all throughput/production falls between values of zero and one hundred, or between values of zero and one. Such scaling may be performed by dividing throughput for a printer by a highest measured throughput for the time period, and multiplying by a desired value (e.g., one hundred, one, etc.).

In a further embodiment, production is determined as a number of feet of print media printed per unit time, a number of pages printed per unit time, a number of minutes of up time per unit time, a number of minutes spent printing per unit time, or a number of print jobs printed per unit time.

In one embodiment, at least one printer 112 in the population 150 of printers is operated by a different legal entity than the subject printer 140. In such an embodiment, performance data may be anonymized, de-identified, or aggregated by controller 122 prior to sending production target data to a print server 114 managing the subject printer 140. This ensures that separate entities may confidently share performance data without compromising privacy concerns. Alternatively, the population 150 considered for each legal entity may be selected solely from printers 112 of that legal entity.

In step 204, controller 122 determines a production target for the subject printer 140 relative to the population 150 of printers 112. The determination is based on the performance data, and the production target dynamically varies over time as a function of the performance data of the population 150 of printers 112. In one embodiment, the production target may be determined as a percentage or fraction of the performance of the printer 112 in the population 150 having the highest amount of production. The production target may be defined as a number of feet of print media printed per unit time, a number of pages printed per unit time, a number of minutes of up time per unit time, a number of minutes spent printing per unit time, or a number of print jobs printed per unit time for a printer 112.

In step 206, controller 122 generates reports indicating deviation of the subject printer 140 from the production target, as the performance data for the subject printer 140 and the population 150 of printers 112 changes over time. This operation may be accomplished, for example, by controller 122 determining production for the subject printer 140 based on received performance data for the subject printer 140, and comparing the production of the subject printer 140 to the production target. If the production of the subject printer 140 is equal to or above the production target, then the subject printer 140 is compliant. Otherwise, the subject printer is not compliant. The reports may indicate an amount of deviation from the target, suggested steps for remedying deviations that are larger than a threshold, etc. These operations comparing a single subject printer 140 to the production target may be performed for any combination of printers desired, such as for every printer 112 in the population, or a subset thereof.

In step 208, controller 122 transmits the reports via interface 126 to a print server 114 of a print shop 110 that operates the subject printer 140. The reports are presented via a display of the print server 114 to operators of the print shop, who may elect to change operations of the subject printer 140 to correct any deviation of the subject printer 140.

Method 200 provides a technical benefit over prior techniques, because it enables the performance of a printer to be tracked in real-time against a target that is representative of the printer's capabilities in a real-world operating environment. That is, by comparing production of the subject printer 140 to the production of other printers that actually physically exist and are operated in other print shops, realistic expectations may be applied to production targets for the subject printer 140. This also beneficially enhances the ability to determine that the subject printer 140 is operating sub-optimally.

Figure 3:
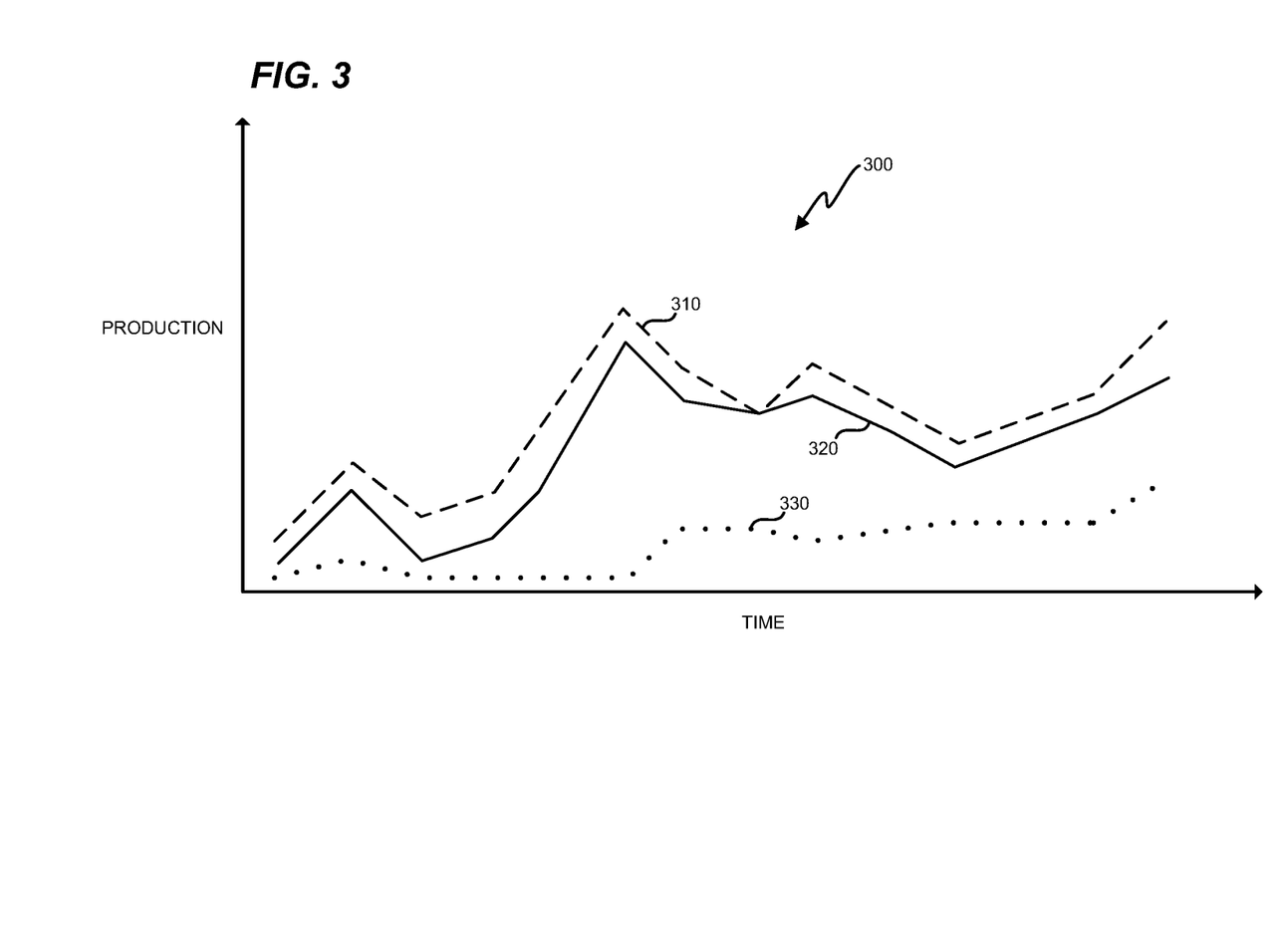
FIGS. 3-4 are charts depicting dynamic printer production tracking in an illustrative embodiment.
Figure 4:
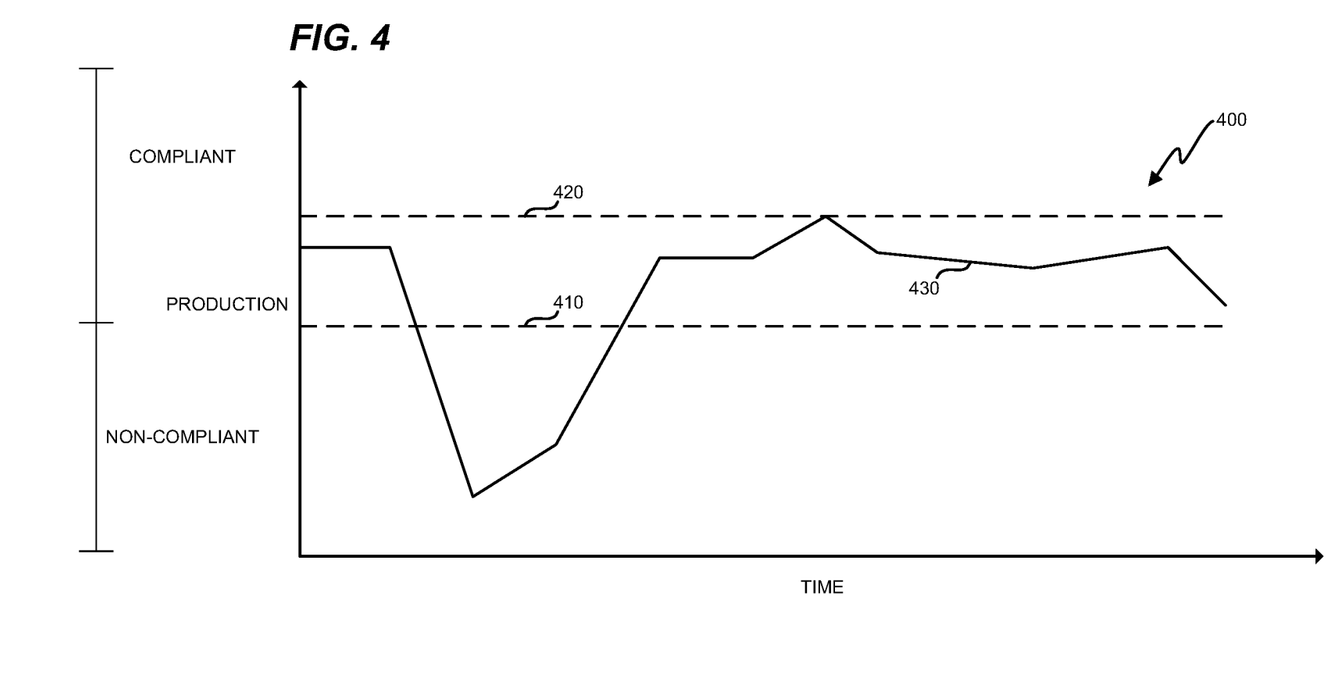

FIGS. 3-4 are charts depicting dynamic printer production tracking in an illustrative embodiment. These charts may be generated and included in reports provided by a printer analytics server 120 to a print server 114. FIG. 3 depicts a chart 300 comparing the production of a subject printer 140 over time (e.g., day-by-day, hour-by-hour, minute-by-minute, etc.) to a most productive printer and a least productive printer of the same model. To this end, line 310 represents the highest production achieved by a printer of the same model as the subject printer, line 320 represents the production of the subject printer 140, and line 330 represents the lowest reported production by a printer of the same model as the subject printer 140.

Data from the chart 300 may be utilized to determine the performance of the subject printer 140 as a percentage of the highest production 420 reported by any printer of the same model. Specifically, FIG. 4 is a chart 400 that presents the highest production 420, and further depicts a production target 410 that comprises a percentage (e.g., sixty percent, eighty percent, ninety percent, etc.) of the highest production reported for each day. Production 430 of the subject printer 140 is then represented relative to the highest production 420 and the production target 410. When production 430 of the subject printer 140 is below the production target 410, the subject printer 140 is considered non-compliant.

Figure 5:
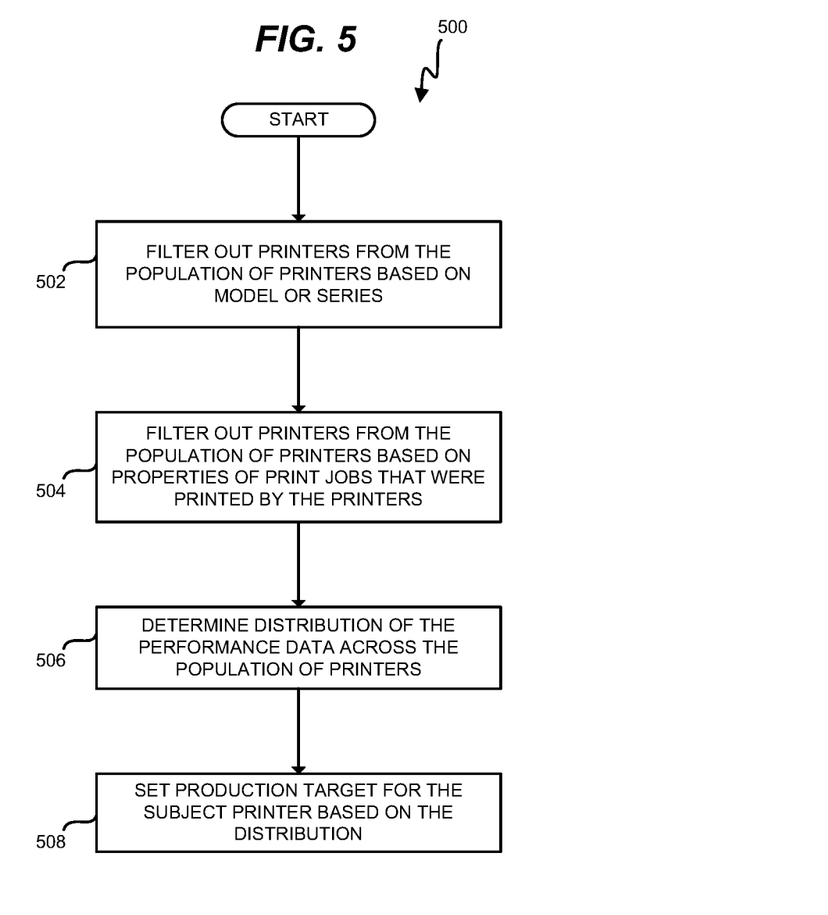
FIG. 5 is a flowchart illustrating a method for setting production targets for a subject printer based on performance data for a population of printers in an illustrative embodiment.

FIG. 5 is a flowchart illustrating a method 500 for setting production targets for a subject printer 140 based on performance data for a population 150 of printers 112 in an illustrative embodiment. Thus, method 500 may comprise a detailed implementation of step 204 in some embodiments.

Step 502 includes filtering out printers 112 from the population 150 of printers 112, based on at least one of a model or series of each of the printers 112 in the population 150 of printers 112. This may be performed, for example, by removing any printers from consideration that are not the same model, or are not the same series, as the subject printer 140. The model and/or serial number for each printer may be determined based on input from the print servers 114 and/or printers 112.

Step 504 includes filtering out printers 112 from the population 150 of printers 112, based on a properties of print job that were printed by the printers 112. For example, filtering may be performed for at least one of a number of print jobs printed, a size of print jobs printed, and a color of print jobs printed by a printer 112. That is, printers 112 in the population 150 that have printed less than a threshold number or size of print jobs during the period may be filtered out of the population 150. This ensures that only fully active printers are considered for setting production targets. In a similar manner, printers 112 that are operated for color operations instead of monochrome (or vice versa) may be filtered out, as monochrome printing is often notably faster than color printing and hence may skew results for printers 112 using color.

Step 506 includes determining a distribution of the performance data across the population 150 of the printers 112. This may be performed by determining the production of each of the printers 112 in the population, and calculating a mean, median, standard deviation, and/or other statistical metrics from the production data for the population of printers 112.

Step 508 includes setting a production target for the subject printer 140 based on the distribution of the performance data across the population 150 of printers 112. For example, the production target may comprise a top quartile, a number of standard deviations from a mean production of printers 112 in the population 150, or a median or mean of the performance data. These production targets are dynamically updated over time for each of the printers 112 in the population 150, based on new performance data received for the printers 112, resulting in dynamic changes to expectations of production for the printers 112 over time.

In one embodiment, to establish a production target, time series data for all printers 112 in the population 150 is evaluated over a specified time period (e.g., one day, five days, one month, six months, one year, etc.). A best production is measured by capturing the maximum production achieved by a printer (a "target printer") in the selected duration within portions of the specified time period. For example, in a specified time period of three months, the best hourly performance rate for throughput/production might be ten thousand pages per hour, the best daily performance might be one hundred and eighty thousand pages per day, and the best weekly performance might be four hundred and fifty thousand pages per week, etc. Average production values may be determined in accordance with techniques for cumulative moving averages.

Method 500 provides a technical benefit by ensuring that the printers 112 considered for comparison against the subject printer 140 are similar in nature and operation, which increases the relevance of determined production targets. Furthermore, method 500 allows for real-time performance tracking, which is highly beneficial in ensuring that a printer continues to operate at or near its real-world peak performance. By way of example, if a model of printer has not been sold in years, but printers of the model still in active use and are aging, real-world performance data may accurately indicate the actual capabilities of these printers as they degrade over time.

Figure 6:
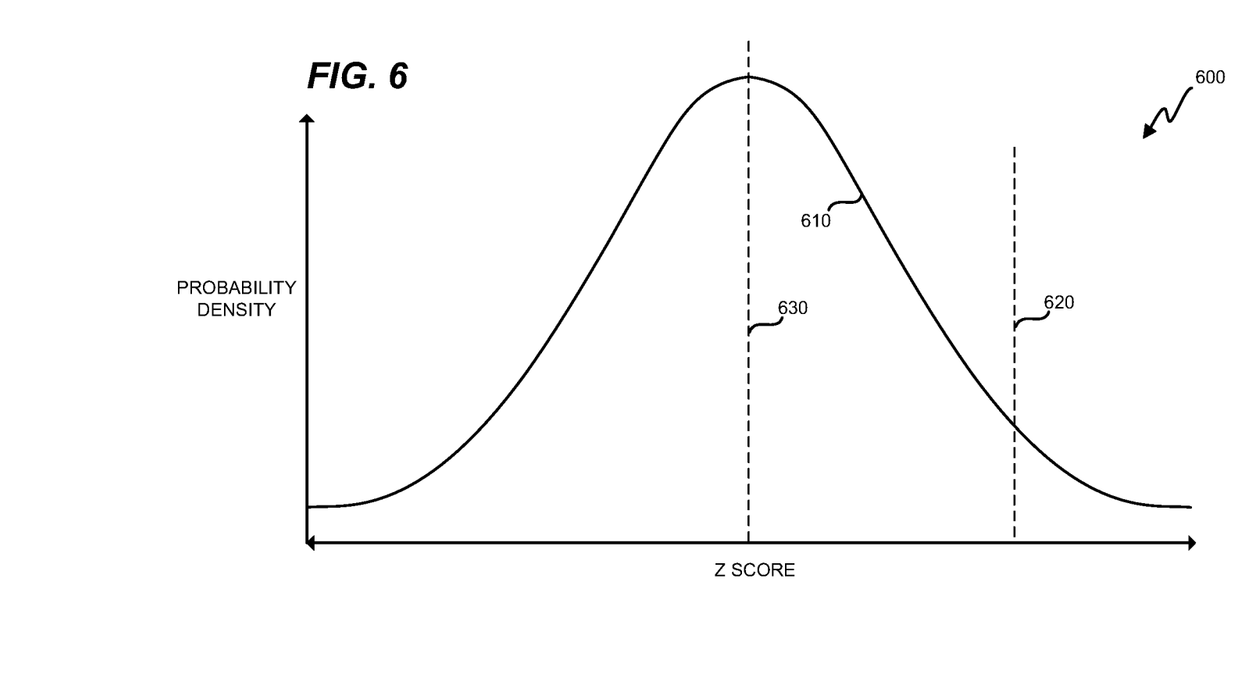
FIG. 6 depicts a distribution of printer performance in an illustrative embodiment.

FIG. 6 depicts a distribution 610 of printer performance in an illustrative embodiment. In this embodiment, a production target 620 is chosen as a number of standard deviations (e.g., a z-score) above a median 630 of the distribution 610. While distribution 610 is depicted as a normal distribution, in further embodiments different distributions are possible, depending on received performance data.

Figure 7:
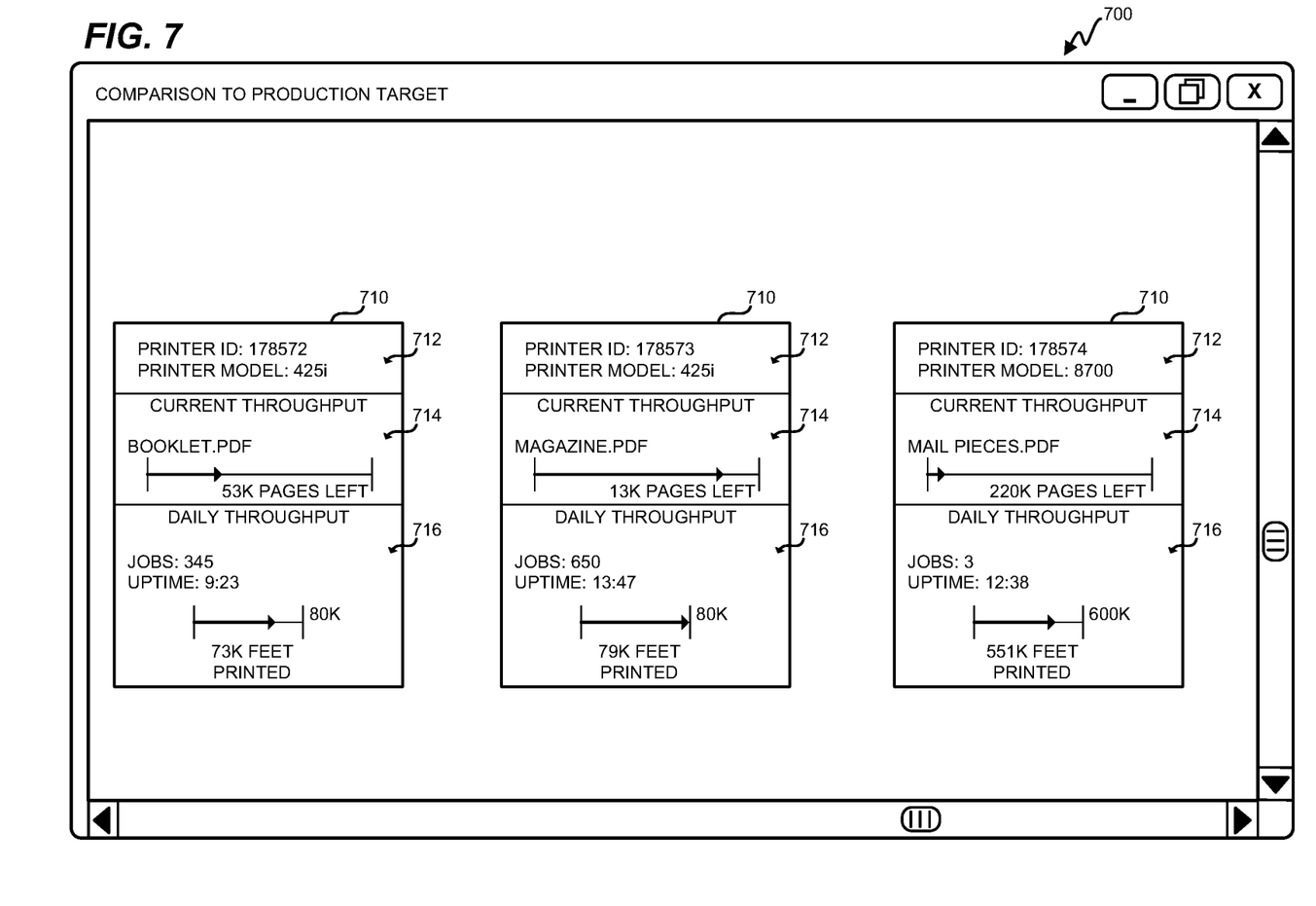
FIG. 7 depicts a Graphical User Interface (GUI) that includes dynamic production targets based on performance for a population of printers in an illustrative embodiment.

FIG. 7 depicts a Graphical User Interface (GUI) 700 that includes dynamic production targets based on performance for a population of printers in an illustrative embodiment. GUI 700 may be presented, for example, at a print server 114 for a print shop 110, based on input from printer analytics server 120. In this embodiment, the GUI 700 includes multiple cards 710 which each report the status of a separate printer 112 at the print shop 110. The card 710 for each printer 112 includes an identification region which includes an identifier (ID) for the printer, as well as a model or series of the printer 112. Each card 710 also includes a region 714 which reports the current printing status of the printer 112. In this embodiment, the current printing status is reported using the name of the current print job being printed by the printer 112, as well as a number of pages left to print for that print job. The card 710 also reports a daily throughput of the printer 112, although in further embodiments the time period may vary. The daily throughput is reported as compared to a production target (e.g., "80 k," "600 k," etc. depending on model), and the production target is dynamically determined based on real-world performance data reported for other printers 112 of the same model.

Figure 8:
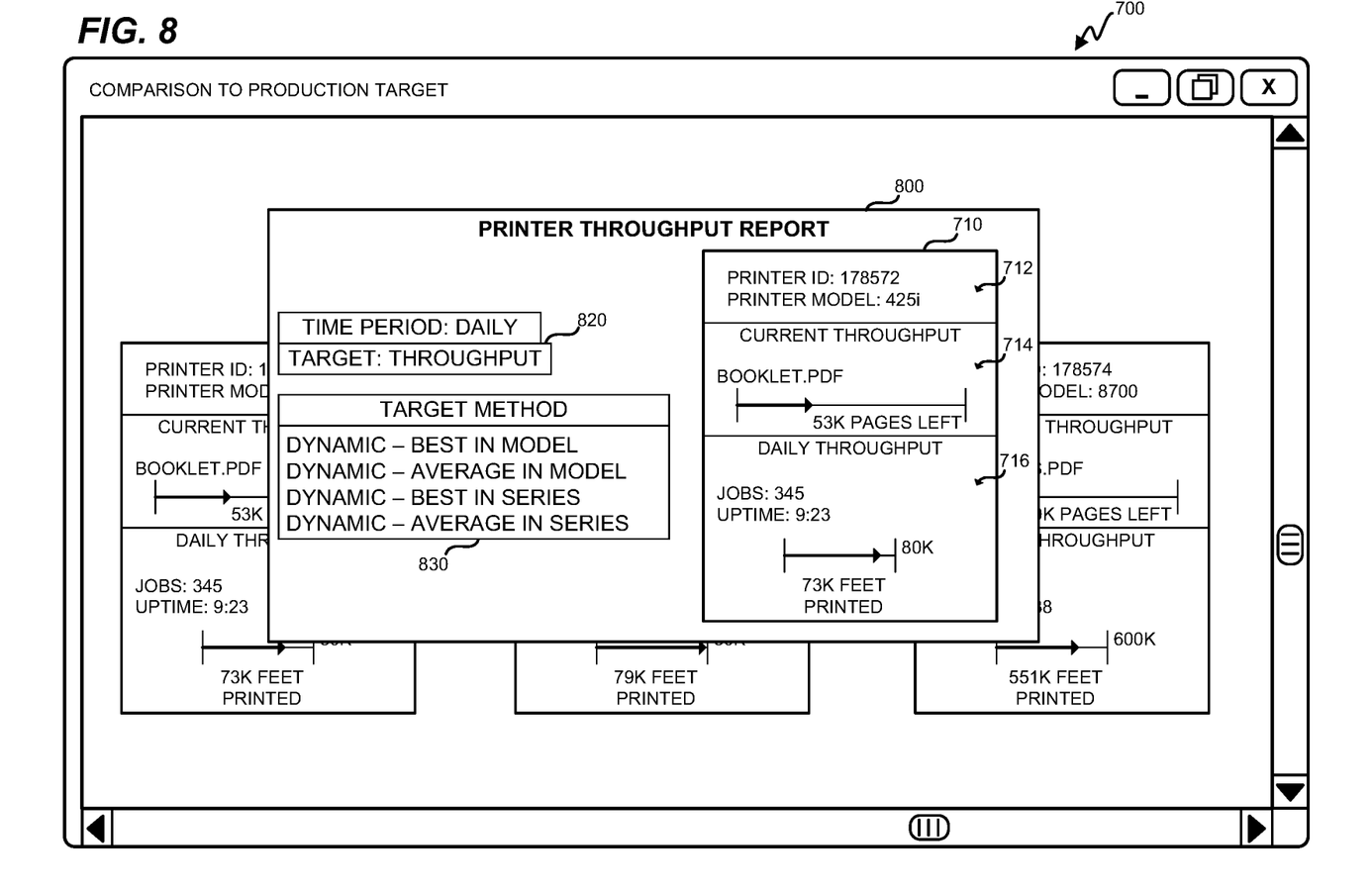
FIG. 8 depicts a GUI for assigning a production target to a printer in an illustrative embodiment.

FIG. 8 depicts a GUI 800 for assigning a production target to a printer in an illustrative embodiment. GUI 800 may be presented, for example, upon selection of a card 710 from GUI 700. GUI 800 includes options 820 for setting the dynamic production target for the printer represented by the card 710. The options 820 enable the setting of a time period, whether the target is set to throughput, number of print jobs, etc. GUI 800 also includes options 830 enabling the selection of a target method for the printer represented by the card, such as the production of the best printer of the same model, production of the best printer in the same series, production of an average printer of the same model, or production of an average printer in the same series. This printer-by-printer target setting enables performance data for the entire population 150 of printers to be used to set targets which are bespoke to each print shop.

Examples

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Figure 9:
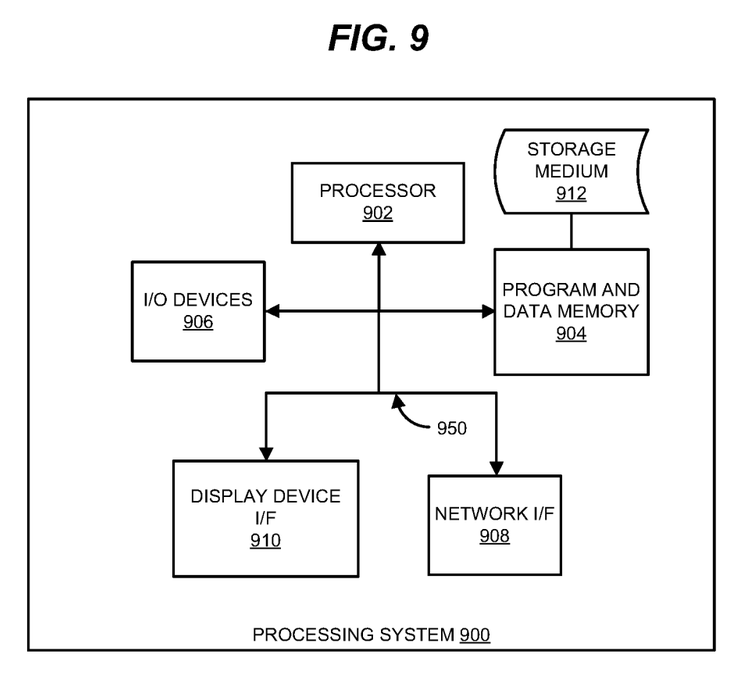
FIG. 9 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of printer monitoring environment 100 to perform the various operations disclosed herein. FIG. 9 illustrates a processing system 900 operable to execute a computer readable medium embodying programmed instructions to perform desired functions in an illustrative embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope of the invention is not limited to those specific embodiments. The scope of the invention is defined by the following claims and any equivalents thereof.

What is claimed is:

1. A system comprising:
 a printer analytics server comprising:
  a memory;
  an interface configured to collect performance data from a population of printers and a subject printer on an ongoing basis for storage in the memory; and
  a controller configured to determine a production target for the subject printer relative to the population of printers based on the performance data, wherein the production target dynamically varies over time as a function of the performance data of the population of printers,
wherein the controller is further configured to generate reports indicating deviation of the subject printer from the production target, as the performance data for the subject printer and the population of printers changes over time, and to transmit the reports to a print server of a print shop that operates the subject printer.

2. The system of claim 1 wherein:
the production target is selected from the group consisting of: a number of feet of print media printed per unit time, a number of pages printed per unit time, a number of minutes of up time per unit time, a number of minutes spent printing per unit time, and a number of print jobs printed per unit time.

3. The system of claim 1 wherein:
the controller is further configured to determine the performance data for the population of printers over at least one of: multiple print jobs, a predefined period of time, or a rolling period of time.

4. The system of claim 1 wherein:
the controller is further configured to filter out printers from the population of printers, based on at least one of a model or series of each of the printers in the population of printers.

5. The system of claim 1 wherein:
the controller is further configured to filter out printers from the population of printers, based on at least one of a number of print jobs printed, a size of print jobs printed, and a color of print jobs printed.

6. The system of claim 1 wherein:
the controller is further configured to set the production target for the subject printer based on a distribution of the performance data across the population of printers.

7. The system of claim 6 wherein:
the production target comprises at least one of a top quartile, a number of standard deviations from a mean, or a median of the performance data.

8. The system of claim 1 wherein:
at least one printer in the population of printers is operated by a different legal entity than the subject printer.

9. A method comprising:
collecting performance data from a population of printers and a subject printer on an ongoing basis for storage in memory;
determining a production target for the subject printer relative to the population of printers based on the performance data, wherein the production target dynamically varies over time as a function of the performance data of the population of printers;
generating reports indicating deviation of the subject printer from the production target, as the performance data for the subject printer and the population of printers changes over time; and
transmitting the reports to a print server of a print shop that operates the subject printer.

10. The method of claim 9 wherein:
the production target is selected from the group consisting of: a number of feet of print media printed per unit time, a number of pages printed per unit time, a number of minutes of up time per unit time, a number of minutes spent printing per unit time, and a number of print jobs printed per unit time.

11. The method of claim 9 wherein:
the performance data for the population of printers is determined over at least one of: multiple print jobs, a predefined period of time, or a rolling period of time.

12. The method of claim 9 further comprising:
filtering out printers from the population of printers, based on at least one of a model or series of each of the printers in the population of printers.

13. The method of claim 9 further comprising:
filtering out printers from the population of printers, based on at least one of a number of print jobs printed, a size of print jobs printed, and a color of print jobs printed.

14. The method of claim 9 further comprising:
setting the production target for the subject printer based on a distribution of the performance data across the population of printers.

15. The method of claim 14 wherein:
the production target comprises at least one of a top quartile, a number of standard deviations from a mean, or a median of the performance data.

16. The method of claim 9 wherein:
at least one printer in the population of printers is operated by a different legal entity than the subject printer.

17. A non-transitory computer readable medium embodying programmed instructions which, when executed by a processor, are operable for:
collecting performance data from a population of printers and a subject printer on an ongoing basis for storage in memory;
determining a production target for the subject printer relative to the population of printers based on the performance data, wherein the production target dynamically varies over time as a function of the performance data of the population of printers;
generating reports indicating deviation of the subject printer from the production target, as the performance data for the subject printer and the population of printers changes over time; and
transmitting the reports to a print server of a print shop that operates the subject printer.

18. The non-transitory computer readable medium of claim 17 wherein:
the production target is selected from the group consisting of: a number of feet of print media printed per unit time, a number of pages printed per unit time, a number of minutes of up time per unit time, a number of minutes spent printing per unit time, and a number of print jobs printed per unit time.

19. The non-transitory computer readable medium of claim 17 wherein:
the performance data for the population of printers is determined over at least one of: multiple print jobs, a predefined period of time, or a rolling period of time.

20. The non-transitory computer readable medium of claim 17 wherein the instructions are further operable for:
filtering out printers from the population of printers, based on at least one of a model or series of each of the printers in the population of printers.

* * * * *